April 24, 1951  C. R. MARSH  2,550,488
RADIATION COUNTER
Filed Oct. 27, 1948
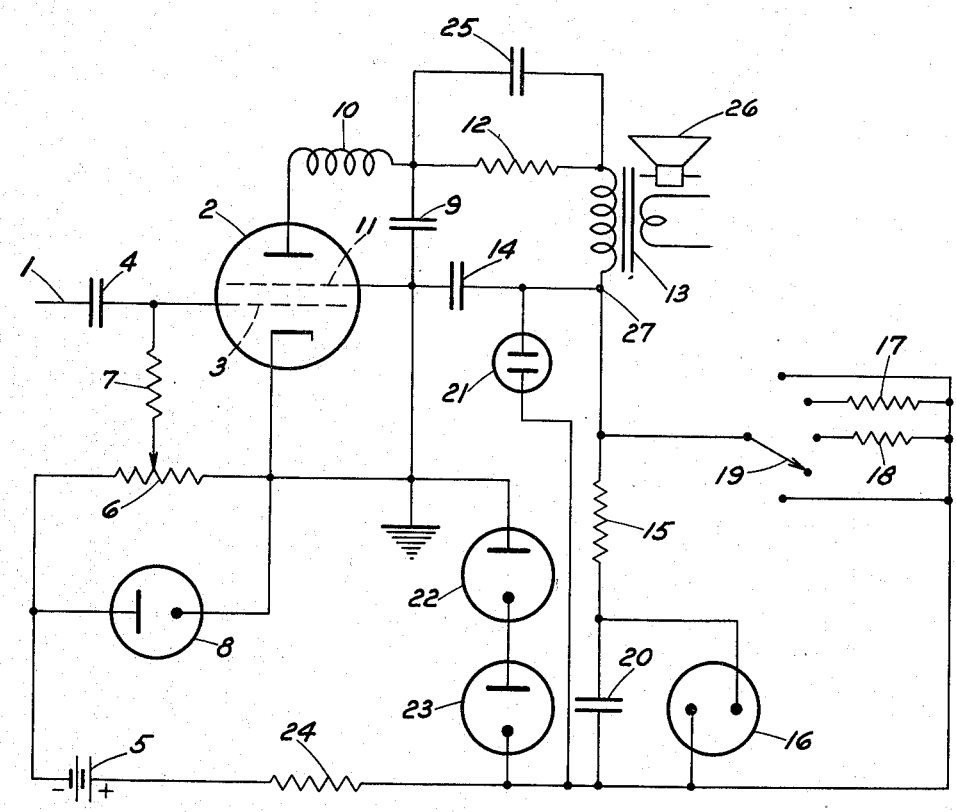
INVENTOR.
Charles R. Marsh
BY
ATTORNEY Patented Apr. 24, 1951

2,550,488

UNITED STATES PATENT OFFICE 2,550,488

RADIATION COUNTER

Charles R. Marsh, State College, Pa., assignor to the United States of America as represented by the United States Atomic Energy Commission Application October 27, 1948, Serial No. 56,847

10 Claims. (Cl. 177—311)

My invention relates to radiation counters and more particularly to a pulse type counter or rate meter circuit for inclusion in a system for use in the detection of alpha and beta particles, gamma rays and slow and fast neutrons in the proportional range, or for use in a system in the Geiger range, and for other uses.

In the prior art various types of scaling and rate meter circuits have been employed for the detection and/or measurement of radiation. The proportional counter serves as a measure of the average intensity of radiation. It may employ an ionization chamber or other pickup device which feeds pulses through conventional amplifiers to a pulse equalizer, such as a multivibrator or univibrator biased to cut off, so that pulses of random size may be utilized to produce uniform (generally rectangular) pulses which in turn are supplied to an electrical tank circuit that provides the necessary damping for the meter or indicator. See Review of Scientific Instruments, vol. 7, page 450. The tank circuit, usually of the resistor-capacitor type, is so arranged that each pulse to be counted causes a definite amount of charge to be placed on the capacitor in a time short compared with the average spacing of pulses. The charge on the capacitor leaks off through the high resistor, making the average potential across the capacitor proportional to the counting rate, and thus proportional to the activity of the radioactive sample. Improvements have been made in this basic circuit by reducing bulkiness, through elimination of batteries, and by increasing the counting range of the instrument. See Review of Scientific Instruments, vol. 17, page 323. However, no provision has been made for response to individual radioactive particles, or for any spontaneous audible indication of the existence of these particles. In addition, the above systems are sluggish and slow, and only provide an average response. They are not suited to the detection of low levels of alpha activity in the presence of high beta and gamma activity. Due to the high amplifier gain required and attendant microphonics, pulse ion chambers have been found impractical as alpha survey instruments. In addition the instruments must be closely followed, and visibility must be such at all times that the average radiation may be read.

Applicant with a knowledge of all these defects in and objections to the prior art has for an object of his invention the provision of a pulse type rate meter circuit which is responsive to individual particles of radiation.

Applicant has as another object of his invention the provision of a rate meter circuit which will provide audible indication of individual particles of radioactive material as they are detected.

Applicant has as another object of his invention the provision of a system permitting the rapid survey of places of prospective contamination by making it sensitive to individual particles of contamination to provide spontaneous audible indication thereof.

Application has as a further object of his invention the provision of a pulse type survey instrument for detecting radiation employing a proportional counter and permitting the use of an amplifier of lower gain for reducing microphony to a negligible proportion.

Applicant has as a still further object of his invention the provision of a pulse type proportional counter circuit which is especially adapted to the detection of low levels of alpha activity in the presence of high levels of beta and gamma activity.

Other objects and advantages of my invention will appear from the following specification and accompanying drawings and the novel features thereof will be particularly pointed out in the annexed claims.

In the drawings the sole figure discloses a schematic of a pulse type rate meter circuit to provide audible indication of individual particles of radiation.

The circuit of the present invention is ordinarily employed to produce audible indications or "clicks" in the output of a loud speaker or sound reproducing device when radioactivity is detected by a survey probe. Various types of survey probes, such as those disclosed in the copending application of Borkowski, Ser. No. 748,433, filed May 16, 1947, may be utilized, and the output of the survey probe (not shown) may feed through a conventional amplifier of preferably three stages (not shown) to the input 1 of the pulse circuit shown in the drawing. However, the tubes of the amplifier are preferably biased to operate in a non-linear manner.

The input 1 feeds the control grid 3 of a gas tetrode 2 through condenser 4 which is a part of the conventional resistance coupling employed between the last stage of the usual amplifier (not shown) and the pulse circuit. Negative bias for grid 3 is furnished from the B supply source 5 through voltage divider 6 and resistor 7. This is accomplished by placing the cathode of tube 2 at ground potential and maintaining B(—) at some selected point below ground, such as 75 volts. This voltage, of course, is determined by the constants of the circuit, and to aid in the maintenance of this potential, a voltage regulator tube 8 is shunted across voltage divider 6. The negative bias normally holds the tube 2 in a non-conducting state. A positive pulse through input circuit 1 which is greater than the difference between the bias and that necessary for cutoff fires the tube 2. Signals less than the threshold voltage, that is, the difference between the biasing potential and that required for cutoff, are rejected, thus effectively eliminating spurious pulses due to tube noises, microphonic disturbances, and the induced voltages from firing the tube. A pulse high enough to fire the tube causes a charge to be transmitted through it which is independent of the size of the triggering pulse.

Potential is applied to the anode of tube 2 by condenser 9 which is coupled thereto through inductance or reactance 10. The capacitor 9 is preferably about .1 mfd. and is bridged across the inductance 10 and the cathode of tube 2. The screen grid 11 is also maintained at ground potential and acts as a shield. A charge is built up on condenser 9 through resistor 12, primary of transformer 13, from condenser 14, and ultimately from B(+) of source 5. Resistor 12 and condenser 9 cause tube 2 to act somewhat similar to a relaxation oscillator. Condenser 14 may have as great as 40 times the capacitance of condenser 9 and thus tends to hold the lower end 27 of the primary of transformer 13 at a substantially uniform A. C. potential. It is bridged across the circuit between the lower end 27 of the primary winding of transformer 13 and ground so that point 27 has B(+) potential equal to that of supply voltage minus IR loss across resistance 15. I is a linear or quasi-logarithmic function of frequency. The transformer 13 is preferably a 5000/4 ohm 5 watt output transformer.

Condenser 14 is charged up from source 5 through resistor 15 and meter 16. Shunts such as resistors 17, 18 may be employed by actuating selector switch 19 to increase the range of the meter 16 in the usual and well known manner. In addition a large condenser 20, preferably of the electrolytic type of the order 100–1000 mfd., may be shunted across the meter 16 for damping purposes. The selection of the condenser size, of course, will depend upon the damping desired, and the meter employed.

As a protective measure for preventing injury to the meter 16 a neon tube 21 is bridged across the resistor 15 and meter 16, so that when the meter reaches a full scale reading the drop across the resistor 15 and meter 16 will equal the striking voltage of the neon tube 21. This neon lamp provides visual evidence of radioactivity sufficient in intensity to cause full scale deflection, and is more rapid in response than the damped meter. This feature can be important in noisy areas. The well known characteristics of a neon tube which enable it to maintain a constant potential while passing a varying current permit it to also act as a voltage regulator when the threshold potential is reached so that injury to the meter may be obviated. Voltage regulator tubes 22, 23 may be connected in series and employed to maintain the potential regulation between the anode with respect to ground, and the resistor 24 may be inserted to absorb variations in power supply voltage.

In operation, the negative control grid bias normally holds the tube 2 in a non-conducting state, and as indicated heretofore, a positive pulse of a predetermined size fires the tube 2 and discharges the condenser 9 as described more in detail hereinafter. By making the time constant of the grid circuit small and having the bias several times more negative (greater) than cutoff bias, the largest pulse which the preceding stage will transmit is reduced to less than triggering voltage within the time constant. Since the tube 2 will still be conducting at this time, variations in pulse height will have no influence. A pulse height sufficient to fire the tube 2 transmits through it a charge independent of the size of the triggering pulse. The charge is a function of the capacitance of condenser 9, the voltage across the pair of voltage regulator tubes 22, 23, less the IR drop across the recharging network and the tube drop, as well as the time elapsing between pulses.

When the tube 2 fires in response to a positive pulse on its control grid 3, the condenser 9 discharges through it. Inductance 10 is provided to flatten out the discharge curve of the condenser 9, making it more sinusoidal and causing the potential on the plate of the tube 2 to drop below the tube extinguishing potential so that the control grid 3 may regain control of the gas tube 2.

It is important that the grid be able to regain control of tube 2 after each pulse or group of pulses. By properly choosing the values of the anode condenser 9, RF choke 10 and recharging resistor 12, the tube will always oscillate when in discharge, and the grid will be able to cutoff the tube at the desired anode current minimum. Condensers of .1 mfd., chokes of 1–5 mhy., and resistors of 15–20 K are suitable.

After tube 2 ceases to conduct and condenser 9 commences to charge up again through resistor 12, substantially full B(+) potential of around 300 volts appears across the parallel capacitor 25, resistor 12 combination and the primary winding of transformer 13, whose secondary feeds the speaker 26, in the form of a surge. The capacitance of the by-pass condenser 25 is preferably about one-half of that of condenser 9, so that its impedance at the surge frequency may be made negligibly small when compared to that of the primary of transformer 13 and as a result most of the voltage of the recharging surge for condenser 9 appears across the primary winding, and through transformer action produces a sharp "click" in the speaker 26 connected to the secondary of such transformer. It is thus seen that the condenser 9 is recharged by the flow of current from condenser 14.

In the above arrangement it will be noted that the condenser 14 charges up through resistor 15 and meter 16 from source 5, and discharges through primary of transformer 13 and condenser 25, resistor 12 combination to charge condenser 9, in the manner described above. The recharging current for condenser 14 is indicated by the damped microammeter 16 while the network of the transformer primary and resistor-condenser combination act as a two section low pass filter to integrate the recharging current and provide an audible indication of such recharging.

While the power source 5 is only schematically shown and the heater supply for the filament of tube 2 is not indicated, one suitable source, among other known sources, may provide 375 volts at 10 milliamperes for the amplifier and rate meter, and 1000–3000 volts at 5 microamperes for the probe or survey instrument. A voltage regulator tube may be employed to regulate the former, and a 15 va. constant voltage transformer may be employed to supply the primary of the high voltage transformer. To compensate for distortion inthe transformer, potential from the filament supply may be added in phase to the transformer. In addition other known stabilizing features may be employed.

Although the foregoing pulse circuit is similar in many respects to a relaxation oscillator, it is so biased that it acts instead to assure a flow through the meter 16 of current which varies as a function of frequency only, being very nearly independent of pulse magnitude and shape within the usual limits. This also insures against the drift of zero frequency reading on the frequency or rate meter.

Having thus described my invention, I claim:

1. A pulse circuit of the character described comprising a normally inoperative gas electric discharge device, an output circuit for said discharge device including a resistor and a capacitor for intermittently discharging through the discharge device and recharging through said resistor, means for coupling said output circuit to a sound reproducing device, means for periodically rendering said discharge device operative, and means providing a low impedance surge path about said resistor when said capacitor charges for producing pulses across said sound reproducing device.

2. A pulse circuit of the character described comprising a normally inoperative electric discharge device, an output circuit for said discharge device, a resistor and capacitor in said circuit, means for charging said capacitor through the resistor, means for inductively coupling a sound reproducing device to said output circuit, means for rendering said discharge device operative for discharging said capacitor therethrough, and means providing a low impedance path for surges around said resistor to produce pulses across the sound reproducing device when said capacitor is recharging.

3. A pulse circuit of the character described comprising a normally inoperative gas electric discharge device, an output circuit for said electric discharge device including a capacitor for discharging through the discharge device when it is operative, a source of charging current for the capacitor, and a resistor for coupling said source to the capacitor, means for rendering said discharge device operative, and an inductance in the output circuit of said discharge device for lowering the anode potential of said discharge device to cutoff after it is rendered conductive, a sound reproducing device coupled to the output circuit and responsive to surges therein for providing audible indication of the operation of the circuit.

4. A pulse circuit of the character described comprising a normally inoperative gas electric discharge device, an output circuit therefor including a source of electrical potential, a capacitor, and a resistor for feeding a charge from said source to said capacitor, means for coupling a sound reproducing device in said output circuit, means for rendering the discharge device operative for discharging the capacitance therethrough, an inductance interposed in said output circuit between said discharge device and said capacitor for lowering the potential across the discharge device below cutoff during the operation thereof, and means providing a low impedance surge path about said resistor for actuating the sound reproducing device in response to the operation of said discharge device.

5. A pulse circuit of the character described comprising a gas electric discharge device having a control electrode, an output circuit including a resistor and a capacitor fed therethrough, a source of electrical potential for feeding the capacitor, a sound reproducing device coupled to the output circuit, means for applying a potential to the control electrode for causing said discharge device to periodically conduct, and a condenser shunted across said resistor for providing a low impedance path to surges whereby said sound reproducing device is actuated in response to the operation of said discharge device.

6. A pulse circuit of the character described comprising a gas electric discharge device having a control electrode, an output circuit including a resistor and capacitor, a source of electrical potential for periodically charging said capacitor through the resistor, a sound reproducing device coupled to the output circuit, means for impressing a potential on said electrode for periodically firing said discharge device to discharge said capacitor and actuate the sound reproducing device, and inductive means interposed in the output circuit for carrying the potential across the discharge device below the quenching point during the operation of the discharge device.

7. A pulse circuit of the character described comprising a gas electric discharge device having a control electrode, an output circuit including a resistor and a capacitor, a source of electrical potential for supplying a charge to the capacitor through said resistor, a sound reproducing device coupled to the output circuit, means for impressing a potential on the control grid of said discharge device for rendering it periodically operative, and means providing a low impedance path for surges about said resistor when said sound reproducing device is rendered operative in response to the operation of said discharge device.

8. A pulse circuit of the character described comprising a gas electric discharge device having a control electrode, an output circuit including a resistor and capacitor, a source of electrical potential for supplying charge to said capacitor through the resistor, a sound reproducing device inductively coupled to the output circuit for reproducing surges therein, means for impressing a potential on said electrode to periodically render said discharge device operative, an inductance interposed in said output circuit adjacent the discharge device for lowering the potential thereacross to the quenching point during its operation, and means providing a low impedance surge path across the resistor for accentuating the response of the sound reproducing device.

9. A pulse circuit of the character described comprising a gas electric discharge device having a control electrode, an output circuit including a capacitor and a resistor, a sound reproducing device coupled to said output circuit, a storage capacitor of greater capacity than said first capacitor for feeding a charge to said first capacitor through said resistor and the coupling of said sound reproducing device, a source of electrical potential for supplying the capacitors, means for impressing a potential on said electrode to periodically render said discharge device operative for discharging said first named capacitor therethrough, an inductance in said output circuit for lowering the potential across the discharge device below the quenching potential during its operation, means providing a low impedance surge path about the resistor for accentuating the actuation of said sound reproducing device in response to the operation of the electric discharge device, and means for measuring the current flow from said source to the capacitors as the result of the operation of the electric discharge device.

10. A pulse circuit of the character described comprising a gas electric discharge device having a control electrode, an output circuit including a capacitor and a resistor, a storage capacitor of greater capacity than said first capacitor for supplying charge through the resistor to said first capacitor, a sound reproducing device inductively coupled to said circuit between said resistor and said storage capacitor, a source of electrical potential for supplying the storage capacitor, means for applying a potential to said electrode for periodically firing the electric discharge device to discharge said first capacitor therethrough, and means providing a low impedance surge path across the resistor for accentuating the response of the sound reproducing device.

CHARLES R. MARSH.

REFERENCES CITED

The following references are of record in the file of this patent:

UNITED STATES PATENTS

| Number | Name | Date |
|---|---|---|
| 2,176,742 | La Pierre | Oct. 17, 1939 |
| 2,365,763 | Kalb et al. | Dec. 26, 1944 |
| 2,462,140 | Spicer | Feb. 22, 1949 |

OTHER REFERENCES

Publication on page 157, "Experimental Electronics" by Muller, Garman and Drog, published 1942, Prentice Hall.

Publication on pages 88–89, Electronic Industries, Sept. 1946, "Radioactivity Meter for Nuclear Research."